United States Patent [19]

Kitamoto

[11] Patent Number: 4,926,652
[45] Date of Patent: May 22, 1990

[54] AIR CONDITIONER SYSTEM WITH CONTROL FOR OPTIMUM REFRIGERANT TEMPERATURE

[75] Inventor: Manabu Kitamoto, Fuji, Japan

[73] Assignee: Kabushiki Kaisha Toshiba, Kawasaki, Japan

[21] Appl. No.: 306,074

[22] Filed: Feb. 6, 1989

[30] Foreign Application Priority Data

Feb. 9, 1988 [JP] Japan .................................. 63-28105
Feb. 10, 1988 [JP] Japan .................................. 63-29266

[51] Int. Cl.$^5$ .............................................. F25B 7/00
[52] U.S. Cl. ......................................... 62/175; 62/225
[58] Field of Search ................. 62/228.4, 175, 225, 62/212

[56] References Cited

U.S. PATENT DOCUMENTS

| | | | |
|---|---|---|---|
| 4,418,548 | 12/1983 | Sawyer | 62/175 |
| 4,448,038 | 5/1984 | Barbier | 62/225 X |
| 4,480,442 | 11/1984 | Ide et al. | 62/228.4 |
| 4,766,735 | 8/1988 | Gotou | 62/175 |
| 4,771,610 | 9/1988 | Nakashima et al. | |
| 4,787,211 | 11/1988 | Shaw | 62/175 X |

FOREIGN PATENT DOCUMENTS

| | | |
|---|---|---|
| 547326 | 10/1985 | Australia . |
| 549012 | 1/1986 | Australia . |
| 570875 | 3/1988 | Australia . |
| 146486 | 6/1985 | European Pat. Off. . |
| 282782 | 9/1988 | European Pat. Off. . |
| 62-102046 | 5/1987 | Japan . |
| 62-225867 | 10/1987 | Japan . |
| 2194651 | 3/1988 | United Kingdom . |

OTHER PUBLICATIONS

British Search Report dated Apr. 12, 1989.

*Primary Examiner*—William E. Wayner
*Attorney, Agent, or Firm*—Cushman, Darby & Cushman

[57] ABSTRACT

An outdoor unit has at least a variable-capability compressor and an outdoor heat exchanger coupled thereto. A plurality of indoor units each have at least an indoor heat exchanger and a section for outputting demand-capability data according to an air-conditioning load of the indoor heat exchanger. A distributing unit serves to couple the outdoor unit and the plurality of indoor units in parallel to form respective refrigeration cycles, and has a plurality of refrigerant flow controllers corresponding to the respective refrigeration cycles. A first controller sends refrigerant flow control commands associated with the demand-capability data of the indoor units to the refrigerant flow controllers of the distributing unit and outputs sum data of the demand-capability data. A second controller sends a capacity-change control command to the variable-capability compressor of the outdoor unit, in accordance with the sum data from the first controller. A refrigerant super-heat detector detects a degree of refrigerant super-heat in each indoor unit. A third controller sends refrigerant flow compensation commands, associated with a detection output of the refrigerant super-heat detector, to the respective refrigerant flow controllers of the distributing unit.

20 Claims, 5 Drawing Sheets

AIR CONDITIONER SYSTEM WITH CONTROL FOR OPTIMUM REFRIGERANT TEMPERATURE

RELATED APPLICATION

The subject matter of the present invention is generally related to the subject matter of the following U.S. application: application No. 07/225,483, filed July 28, 1988, name of Applicant Kitamoto, now U.S. Pat. No. 4,876,859.

BACKGROUND OF THE INVENTION

1. Field of the Invention

The present invention relates to an air conditioner system with a control for ensuring optimum refrigerant temperature at all times, and, more particularly, to a multi-unit type air conditioner system having a heat-pump type refrigeration cycle, which employs a single outdoor unit to control a plurality of indoor units.

2. Description of the Related Art

Conventionally, the above-mentioned multi-unit type air conditioner system operates one or two compressors of a single outdoor unit, using a single distributing unit, in accordance with a demand-capability based on the air-conditioning load of each indoor unit.

However, in a case where super heat of refrigerant is high (such as when the air-conditioning load of the individual indoor units is high) a multi-unit type air conditioner system having the above conventional structure cannot prevent the refrigerant expelling temperature at one or two compressors from rising to a level significantly higher than that at which it would be under normal operating conditions, with the result that a rapid deterioration of the refrigerant in each compressor in the air conditioner system is likely to occur, in turn, leading to carbonation of the lubricating oil and the seizure moving parts within each compressor, such as pistons and control rods. Further, when the refrigerant suction temperature of each compressor of this type of air conditioner system is high, the temperature of winding of a motor of each compressor is likely to increase above the rated operative range, with the result that in the electric insulation characteristic.

The above shortcomings of the conventional air conditioner system hinder its safe operation.

One such air conditioner system as described above is a super multi-unit type air conditioner system which has an outdoor unit coupled to a plurality of branching units which are in turn coupled to respective indoor units.

According to this type of conventional super multi-unit type air conditioner system, however, discrimination of demand-capability is made only on the basis of the capability (also called horse power) of each indoor unit, without any consideration on pressure loss in a refrigerant pipe connecting each branching unit and its associated indoor unit, although the length, and the height, of this pipe varies depending on its installing environment or condition. It is therefore difficult to provide the optimum refrigerant flow rate control for the demand-capability of each indoor unit. For instance, with a long output frequency pipe in use, the air conditioner system will run in a super heating cycle, so that its safe operation will be hindered.

SUMMARY OF THE INVENTION

Accordingly, it is an object of this invention to provide a new and improved air conditioner system having a control for ensuring optimum flow of a refrigerant, which can prevent a significant increase in refrigerant expelling temperature and refrigerant suction temperature from occurring, thereby to ensure, at all times, the system's operation at the optimum cycle temperature.

It is another object of this invention to provide a highly reliable air conditioner system which can perform optimum refrigerant flow control in accordance with the demand-capability of each indoor unit, without being influenced by the length and height of a refrigerant pipe used in the system.

According to one aspect of this invention, there is provided an air conditioner comprising:

an outdoor unit having at least a variable-capability compressor and an outdoor heat exchanger coupled to the variable-capability compressor;

a plurality of indoor units each having at least an indoor heat exchanger and means for outputting demand-capability data according to an air-conditioning load of the indoor heat exchanger;

a distributing unit for coupling the outdoor unit and the plurality of indoor units in parallel to form respective refrigeration cycles, the distributing unit having a plurality of refrigerant flow control means corresponding to the refrigeration cycles, respectively;

first control means, for supplying to the refrigerant flow control means of the distributing unit refrigerant flow control commands associated with the demand-capability data of each of the plurality of indoor units, and outputting sum data of the demand-capability data;

second control means, for supplying a capacity-change control command to the variable-capability compressor, in accordance with the sum data from the first control means;

refrigerant super-heat detection means for detecting the degree of refrigerant super heat in each indoor unit; and third control means, for supplying refrigerant flow compensation commands associated with a detection output of the refrigerant super-heat detection means, to the respective refrigerant flow control means of the distributing unit.

BRIEF DESCRIPTION OF THE DRAWINGS

These and other objects and features of the present invention should be easily understood from the following detailed description of preferred embodiments, taken with reference to the accompanying drawings, of which:

FIGS. 1 through 4 show a multi-unit type air conditioner system according to the first embodiment of this invention;

DETAILED DESCRIPTION OF THE PREFERRED EMBODIMENTS

To begin with, the first embodiment of this invention will be described below, with reference to FIGS. 1 through 4. For brevity of description, the same reference numerals as given in FIG. 1 are used in FIGS. 2 to 4 to specify identical or corresponding components.

Figure 1:
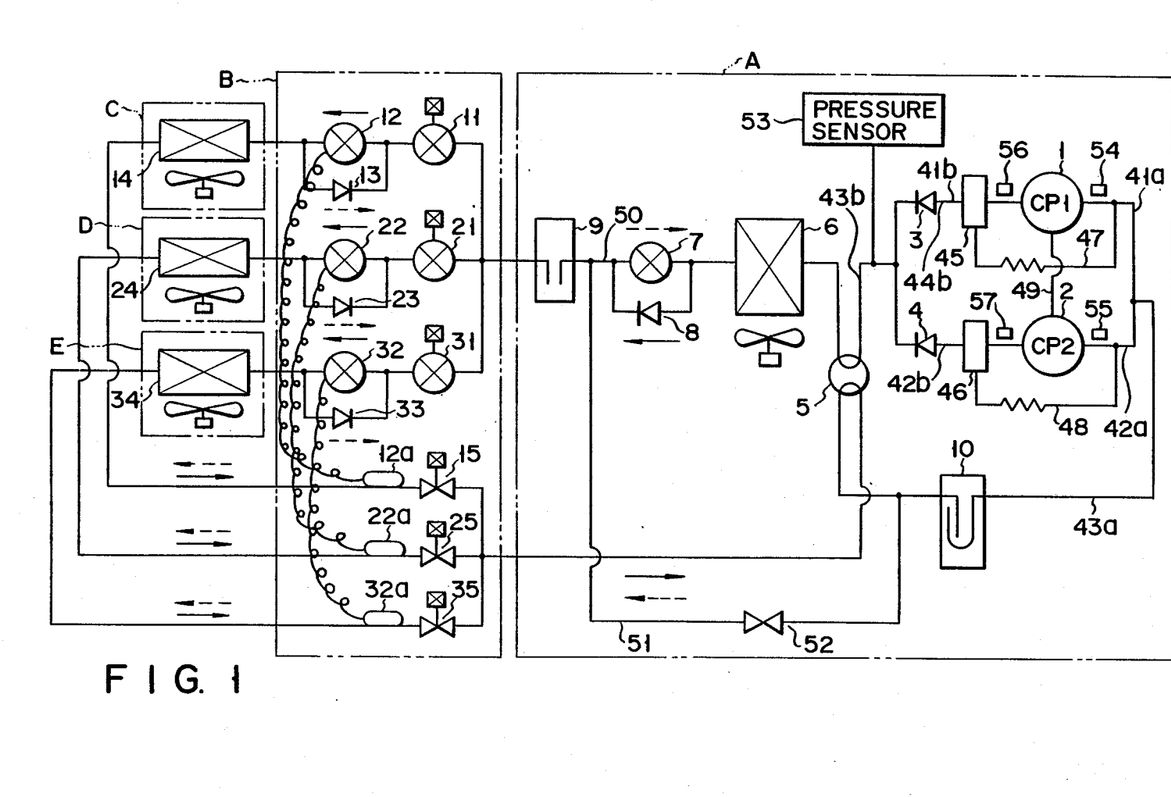
FIG. 1 being a schematic diagram showing the general arrangement of a refrigeration cycle within the air conditioner system.

FIG. 1 shows a heat-pump type refrigeration cycle of a multi-unit type air conditioner system according to a first embodiment of the present invention.

In FIG. 1, reference numeral A denotes an outdoor unit, B denotes a branching unit, and C, D, and E denote indoor units. Outdoor unit A is equipped with two variable-capability compressors 1 and 2 which are coupled in parallel via check valves 3 and 4, respectively. A heat-pump type refrigeration cycle is formed through compressors 1 and 2, a four-way valve 5, a parallel arrangement of an outdoor heat exchanger 6, a heating expansion valve 7, and a check valve 8 for forming a cooling cycle, a liquid tank 9, electrically-powered flow rate control valves 11, 21, and 31, a parallel arrangement of cooling expansion valves 12, 22, and 32, and check valves 13, 23, and 33 for forming a heating cycle, indoor heat exchangers 14, 24, and 34, gas-side opening valves (electromagnetic opening valves) 15, 25, and 35, and an accumulator 10.

Cooling expansion valves 12, 22, and 32 respectively have heat-sensing tubes 12a, 22a, and 32a serving as temperature sensors, and which are respectively attached to gas-side refrigerant pipes of indoor heat exchangers 14, 24, and 34, which are arranged in parallel in the refrigeration cycle.

When a cooling operation is being performed, a refrigerant flows in the direction of the solid arrows illustrated, to thereby form a cooling cycle with outdoor heat exchanger 6 serving as a condenser and indoor heat exchangers 14, 24, and 34 serving as evaporators. When, on the other hand, a heating operation is being performed, the refrigerant flows in the direction of the broken arrows, to thereby form a heating cycle, with indoor heat exchangers 14, 24, and 34 now serving as condensers and outdoor heat exchanger 6 serving as an evaporator.

In such an air conditioner system, the number of compressors in operation and their capability are controlled so as to provide the demand-capability of each of the individual indoor units C, D, and E, and the openings of flow rate control valves 11, 21, and 31 are controlled in order to adjust the rate of the refrigerant flowing in each of indoor heat exchangers 14, 24, and 34.

Cooling expansion valves 12, 22, and 32 serve to maintain constant the amount of heat applied to the refrigerant, irrespective of a changes in the flow rate of the refrigerant, thus ensuring a stable and efficient operation. When the demand-capability of each indoor unit is less than a capability of each of the compressors, the capability of one of the compressors is varied to provide the demand-capability. When this demand-capability becomes greater than the capability, compressor 2 in addition to compressor 1 will be driven. When the demand-capability of each indoor unit decreases under this condition, the capability of compressor 2 will be gradually reduced or even stopped, leaving only compressor 1.

In addition to the above structure, the multi-unit type air conditioner system according to the first embodiment includes, as is shown in FIG. 1, a refrigerant suction side pipe 41a of compressor 1, a refrigerant expelling side pipe 41b, also of compressor 1, a refrigerant suction side pipe 42a of compressor 2, and a refrigerant expelling side pipe 42b of compressor 2. In this embodiment, pipes 41a and 42a are coupled to a common refrigerant suction pipe 43a, and pipes 41b and 42b are similarly coupled to a common refrigerant expelling pipe 43b. The refrigerant suction side pipes 41a and 42a, together with refrigerant suction pipe 43a, constitute a refrigerant suction passage 44a of compressors 1 and 2, while refrigerant expelling side pipes 41b and 42b, together with refrigerant expelling pipe 43b, constitute a refrigerant expelling passage 44b of the compressors.

Pipes 41b and 42b are also coupled with oil separators 45 and 46, which in turn are coupled each to one end of oil return pipes 47 and 48, respectively. The other ends of each of oil return pipes 47 and 48 are respectively coupled to pipes 41a and 42a.

Figure 2:
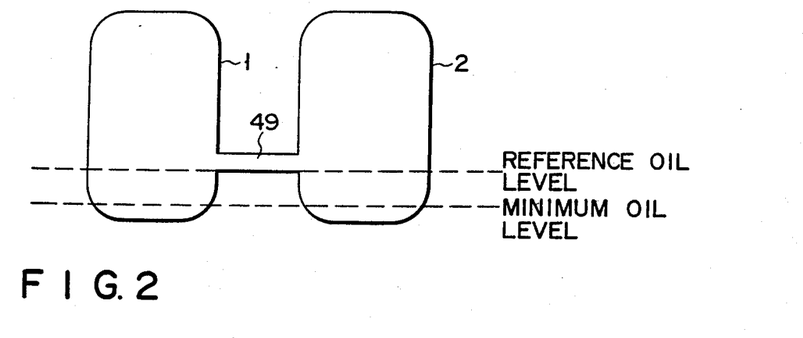
FIG. 2 being a schematic diagram showing how an oil-balancing pipe is mounted between two compressors.

As is shown in FIG. 2, one end of an oil-balancing pipe 49 is coupled to the bottom of the casing of compressor 1, and its other end is coupled to the bottom of the casing of compressor 2.

A fluid refrigerant passage within a refrigeration cycle, a refrigerant pipe (fluid refrigerant passage) 50 provided between liquid tank 9 and the parallel arrangement of heating expansion valve 7 and check valve 8 (for forming a cooling cycle), is coupled to one end of a bypass passage 51 as a cooling cycle, the other end of passage 51 being coupled to refrigerant suction pipe 43a. Bypass passage 51 is further provided with a pulse motor valve (flow rate control valve) 52 whose opening is controllable.

Refrigerant expelling pipe 43b in the refrigeration cycle is coupled with a pressure sensor 53, pipes 41a and 42a of compressors 1 and 2 are respectively provided with suction temperature sensors 54 and 55 for detecting the refrigerant suction temperature, and pipes 41b and 42b are respectively provided with expelling temperature sensors 56 and 57 for detecting the refrigerant expelling temperature.

Figure 3:
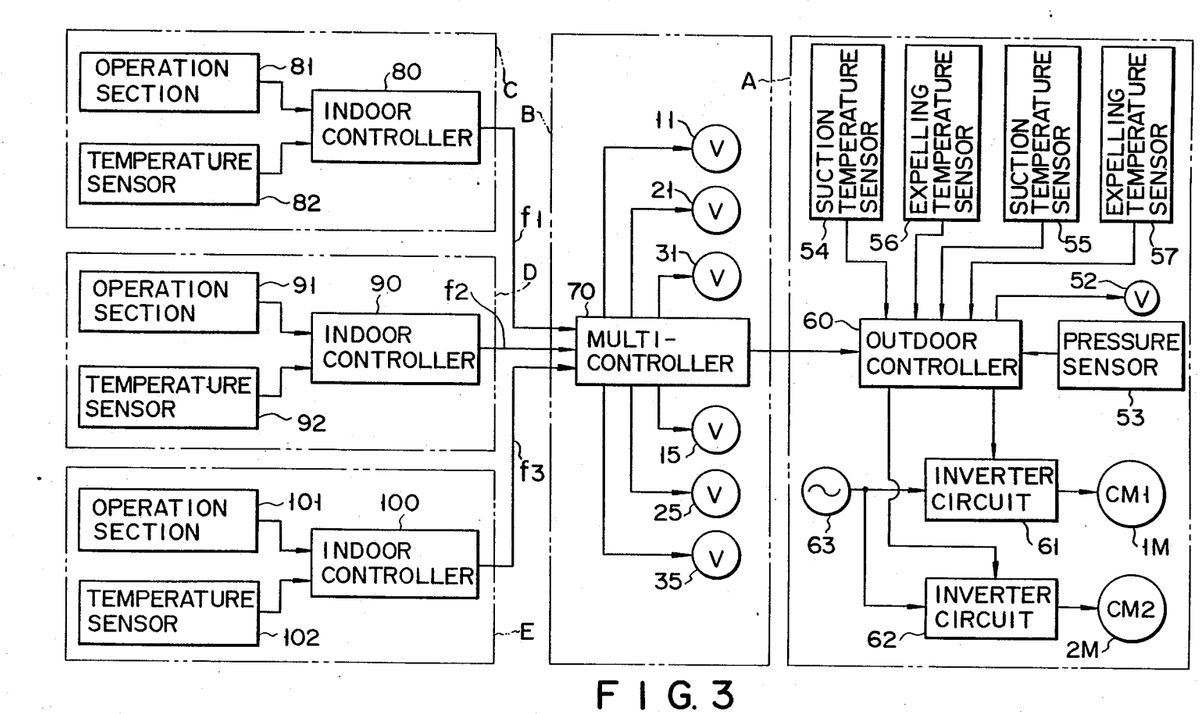
FIG. 3 being a schematic diagram showing the general structure of a refrigeration cycle controller.

FIG. 3 shows a controller for the multi-unit type air conditioner system according to the first embodiment. In FIG. 3, reference numeral 60 denotes an outdoor controller mounted in outdoor unit A, and which comprises a microcomputer and its peripheral circuits, and is coupled at its outputs to pulse motor valve 52, pressure sensor 53, suction temperature sensors 54 and 55, expelling temperature sensors 56 and 57, and inverter circuits 61 and 62. Inverter circuits 61 and 62 rectify the voltage from an AC power source 63, convert the resultant voltages into AC voltages with given frequencies, in accordance with a command from outdoor controller 60, and supply the converted voltages as drive power to compressor motors 1M and 2M, respectively.

Pressure sensor 53 detects a variation of pressure at a high pressure side in the refrigerant cycle, and supplies the detected voltages (0.5 to 4.5 volts) corresponding to the variation of pressure, to outdoor controller 60. That is to say, outdoor controller 60 controls at least operations of compressors 1 and 2 according to the variation of pressure detected by pressure sensor 53.

Reference numeral 70 denotes a multi-controller mounted in branching unit B, and which comprises a microcomputer and its peripheral circuits, and is coupled at its outputs to flow rate control valves 11, 21, and 31 and opening valves 15, 25, and 35.

Reference numerals 80, 90, and 100 denote indoor controllers mounted respectively in indoor units C, D, and E. Controllers 80, 90, and 100 each comprise a microcomputer and its peripheral circuits and are coupled to operation sections 81, 91, and 101, and indoor temperature sensors 82, 92, and 102, respectively. The individual indoor controllers 80, 90, and 100 send frequency setting signals $f_1$, $f_2$, and $f_3$ representing the demand-capability of the individual indoor units C, D, and E to multi-controller 70. Multi-controller 70 in turn acquires the sum of the demand-capability of each of the individual indoor units C, D, and E from the received frequency setting signals $f_1$, $f_2$, and $f_3$, and sends a frequency setting signal. $f_0$ corresponding to the sum to outdoor controller 60.

Note that the multi-controller is described in detail in U.S. Pat. No. 4,720,982 assigned to the present applicant. This description is incorporated herein.

The operation of the air conditioner system constructed thus will now be described below.

Assume that indoor units C, D, and E are together performing a cooling operation. In this case, indoor controller 80 of indoor unit C calculates the difference between the temperature detected by indoor temperature sensor 82 and that set via operation section 81, and sends frequency setting signal $f_1$, corresponding to the temperature difference, to multi-controller 70, as the cooling demand-capability. In similar fashion, indoor controllers 90 and 100 of indoor units D and E send frequency setting signals $f_2$ and $f_3$, as cooling demand-capability to multi-controller 70.

On the basis of frequency setting signals $f_1$, $f_2$, and $f_3$, multi-controller 70 determines the sum of the cooling demand capabilities of the individual indoor units C, D, and E, and sends frequency setting signal $f_0$, corresponding to the acquired sum, to outdoor controller 60. Based on frequency setting signal $f_0$, outdoor controller 60 controls the number of compressors in operation, and the operational frequency F (the sum of output frequencies of inverter circuits 61 and 62). When the sum of the cooling demand capabilities is smaller than the set cooling performance level, outdoor controller 60 drives only compressor, 1, whereas when the sum of the demand capabilities becomes greater than this set level, the controller 60 drives compressors 1 and 2 at the same time.

During the operation of this air conditioner system (cooling, heating, or drying), suction temperature sensors 54 and 55 and expelling temperature sensors 56 and 57 detect the refrigerant suction temperatures and refrigerant expelling temperatures, respectively. When the temperatures detected by these sensors 55 to 57 are all lower than a predetermined, set temperature $T_1$ as indicated by the A zone in FIG. 4, outdoor controller 60 keeps pulse motor valve 52 fully open. When any of the temperatures detected by temperature sensors 54–57 reach the temperature $T_1$, outdoor controller 60 controls the opening of valve 52 as follows.

Figure 4:
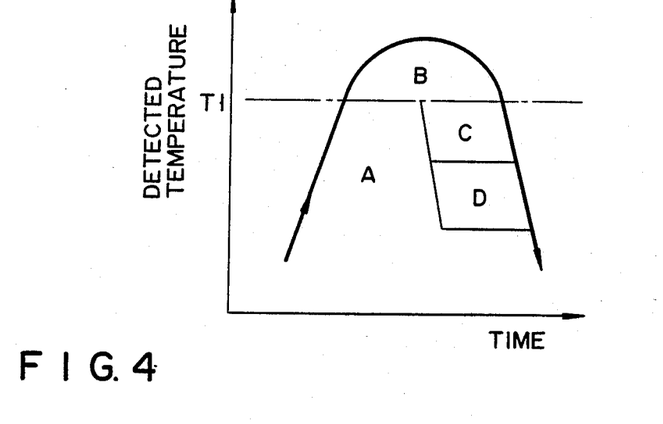
FIG. 4 being a temperature characteristic diagram for explaining a control state of a flow rate control valve.

In controlling the opening of pulse motor valve 52, outdoor controller 60 latches, by priority, that of the detected temperatures from temperature sensors 54–57 which has reached temperature $T_1$ first. In other words, outdoor controller 60 controls the opening of pulse motor valve 52 based on the output from that temperature sensor whose detected temperature has reached the temperature $T_1$ first. When the detected temperature from this reference temperature sensor reaches a level within the B zone, outdoor controller 60 sets the opening of valve 52 to an initially-set opening. This operation permits a low-temperature refrigerant in refrigerant pipe 50 to flow through cooling bypass passage 51 to refrigerant suction pipe 43a. This low-temperature refrigerant effectively reduces the refrigerant temperature on the side of pipe 43a.

After setting the opening of pulse motor valve 52 to its initial value, outdoor controller 60 gradually increases the opening through a similar control by a predetermined number of steps (n pulses) for each given time, in accordance with an increase in the detected temperature. When the detected temperature of the reference temperature sensor reaches the C zone (FIG. 4) that is lower than the set temperature $T_1$, outdoor controller 60 stops increasing the opening of pulse motor valve 52 at that instance and keeps the opening of valve 52 set then. When the detected temperature of the reference temperature sensor further falls to the D zone (FIG. 4), outdoor controller 60 gradually reduces the opening of pulse motor valve 52 by the given number of steps (n pulses) for each given time. When the opening of valve 52 becomes 0, i.e., valve 52 is fully closed by this valve control, the control operation of outdoor controller 60 returns to the initial state.

Before a given time elapses after compressors 1 and 2 stop functioning or start functioning, the temperature detection outputs of the individual temperature sensors 54 to 57 are disregarded.

According to the multi-unit type air conditioner system with the above structure, during the refrigerant cycle, suction temperature sensors 54 and 55 and expelling temperature sensors 56 and 57 respectively detect the refrigerant suction temperatures and refrigerant expelling temperatures of compressors 1 and 2. When any of the outputs of temperature sensors 54–57 reaches the set temperature $T_1$, pulse motor valve 52 is opened. This permits part of a low-temperature fluid refrigerant to flow through cooling bypass passage 52 to suction passage 44a of compressors 1 and 2 from fluid refrigerant passage 50 in the refrigeration cycle. This low-temperature refrigerant reduces the refrigerant temperature in suction passage 44a of compressors 1 and 2. Accordingly, it is possible to prevent a significant increase of the refrigerant expelling temperature or refrigerant suction temperature at compressors 1 and 2 during the refrigeration cycle, which would be caused by the conventional air conditioner system. The present air conditioner system can therefore prevent deterioration of the refrigerant to thereby prevent carbonization of a lubricating oil, seizure of sliding sections in compressors 1 and 2 such as pistons and control rods, and a significant increase in winding temperature of motors of these compressors. Accordingly, the present air conditioner system can perform a stable operation at the optimum cycle temperature. In addition, even when the amount of the refrigerant varies during the refrigeration cycle, the present air conditioner system can compensate for this variation in a relatively short time, thereby preventing a significant change in pressure during the refrigeration cycle.

It should be noted that this invention is in no way restricted to the above particular embodiment, but can be modified in various manners without departing from its scope.

As described above, according to the air conditioner system of to the first embodiment, a cooling bypass passage is provided for communication between the refrigerant passage in the refrigeration cycle and the suction passage of the compressors, a flow rate control valve whose opening is controllable is provided in this bypass passage, suction temperature sensors and expelling temperature sensors are provided to detect the refrigerant suction temperatures and refrigerant expelling temperatures of the compressors, and cycle cooling means is provided to control the opening of the flow rate control valve in accordance with the temperature detection outputs of the individual temperature sensors. With the above design, when any of the outputs of temperature sensors reaches the set temperature, the flow rate control valve is opened. This permits part of a low-temperature fluid refrigerant to flow through the cooling bypass passage to the suction passage sides of the compressors from the fluid refrigerant passage in the refrigeration cycle. This low-temperature refrigerant reduces the refrigerant temperature in the suction passage of the compressors. Accordingly, it is possible to prevent a significant increase of the refrigerant expelling temperature or refrigerant suction temperature of compressors, thus ensuring a stable operation at the optimum cycle temperature.

Figure 5:
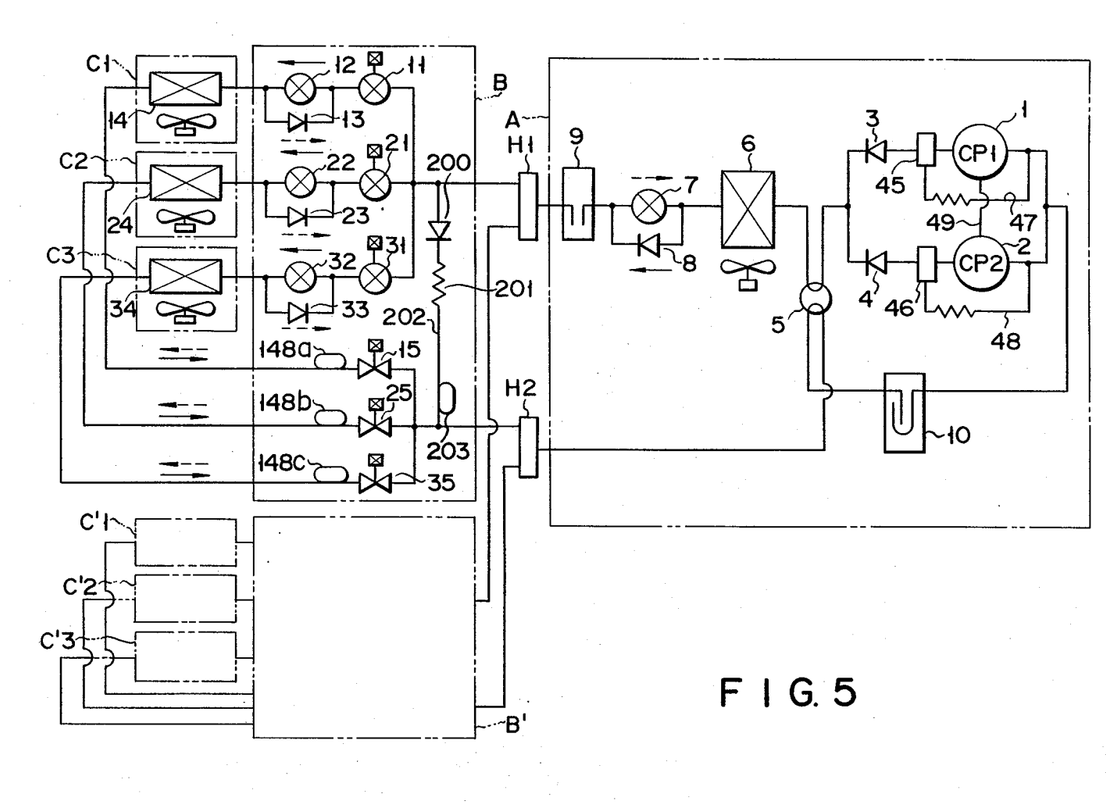
FIG. 5 is a diagram illustrating a refrigeration cycle according to the second embodiment of this invention.
Figure 6:
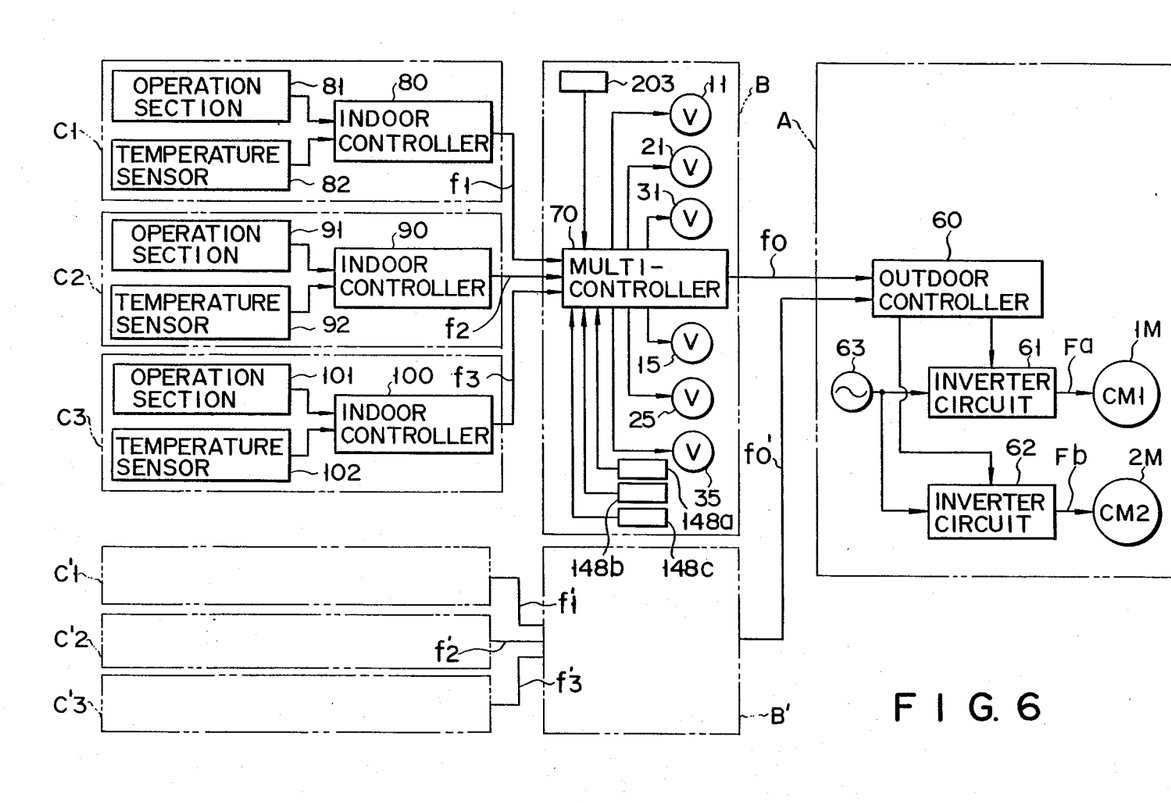
FIG. 6 is a diagram illustrating the configuration of a controller used in the second embodiment.
Figure 7:
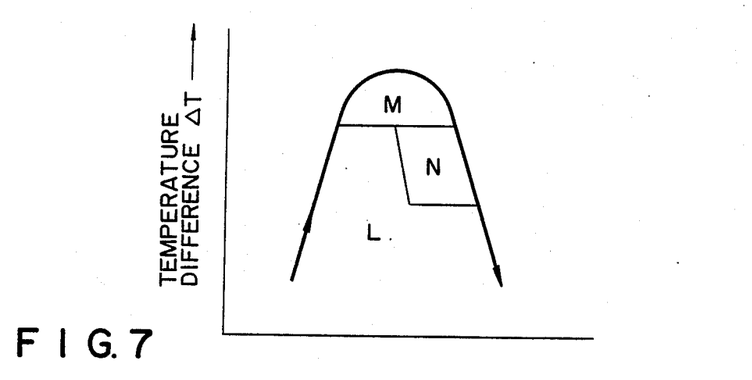
FIG. 7 is a diagram for explaining the operation of this embodiment.

Referring now to FIGS. 5 through 7, a description will be given of this invention as applied to a super multi-unit type air conditioner system as the second embodiment. The same reference numerals as given in FIG. 5 are used in FIGS. 6 and 7 to specify identical or corresponding components for omission of their description.

In FIG. 5, reference numeral A denotes an outdoor unit, B and B' denote first and second branching units, and $C_1$, $C_2$ and $C_3$ and $C_{1'}$, $C_{2'}$ and $C_{3'}$ denote indoor units, the first group of indoor units being coupled to branching unit B and the second group to branching unit B'.

Outdoor unit A is equipped with two variable-capability compressors 1 and 2 which are coupled in parallel via check valves 3 and 4, respectively.

A heat-pump type refrigeration cycle is formed through compressors 1 and 2, a four-way valve 5, a parallel arrangement of an outdoor heat exchanger 6, a heating expansion valve 7 and a check valve 8 for forming a cooling cycle, a liquid tank 9, a fluid-side header H1, electrically-powered flow rate control valves (pulse motor valves) 11, 21 and 31, a parallel arrangement of cooling expansion valves 12, 22 and 32 and check valves 13, 23 and 33 for forming a heating cycle, indoor heat exchangers 14, 24 and 34, gas-side opening valves (electromagnetic opening valves) 15, 25 and 35, a gas-side header H2, and an accumulator 10.

In a cooling operation, a refrigerant flows in the direction of the illustrated solid arrows to thereby form a cooling cycle with outdoor heat exchanger 6 serving as a condenser and indoor heat exchangers 14, 24 and 34 serving as evaporators. In a heating operation, on the other hand, the refrigerant flows in the direction of the illustrated, broken arrows through the switching operation of four-way valve 5 to thereby form a heating cycle, with indoor heat exchangers 14, 24 and 34 serving as condensers and outdoor heat exchanger 6 serving as an evaporator.

First and second branching units B and B' are coupled between the fluid side refrigerant pipes and gas-side refrigerant pipes communicating with respective indoor units $C_1$, $C_2$ and $C_3$ and $C_{1'}$, $C_{2'}$ and $C_{3'}$. Each of first and second branching units B and B' comprises refrigerant flow rate control valves 11, 21 and 31, cooling expansion valves 12, 22 and 32, check valves 13, 23 and 33 for forming a heating cycle and gas-side opening valves 15, 25 and 35.

An oil separator 45 is provided at the refrigerant pipe on the refrigerant expelling side of compressor 1, and an oil bypass pipe 47 is provided to extend from the oil separator 45 to the refrigerant pipe on the refrigerant suction side of compressor 1. Similarly, an oil separator 46 and an oil bypass pipe 48 are provided at the refrigerant pipes on the refrigerant expelling and suction sides of compressor 2.

The casings of compressors 1 and 2 are coupled to each other by means of an oil-balancing pipe provided at the casings at the reference oil level, thereby permitting the lubricating oil to flow from one casing to the other.

According to this super multi-unit type air conditioner system, the quantity of compressors 1 and 2 in operation and their capacities are controlled in accordance with the sum of the demand capabilities of the individual indoor units $C_1$, $C_2$ and $C_3$ and $C_{1'}$, $C_{2'}$ and $C_{3'}$, and the openings of refrigerant flow rate control valves 11, 21 and 31 are controlled in accordance with the demand capabilities of the respective indoor units.

In addition to the above arrangement, the super multi-unit type air conditioner system according to the second embodiment is designed as follows.

In FIG. 5 giving a specific arrangement of first branching unit B, a bypass pipe 202 is provided extending from the collected assembly of the fluid-side refrigerant pipes communicating with indoor units $C_1$, $C_2$ and $C_3$ to the collected assembly of the gas-side refrigerant pipes communicating with indoor units $C_{1'}$, $C_{2'}$ and $C_{3'}$, through a check valve 200 and a capillary tube 201 in the named order.

A first temperature sensor 203 is mounted to the output side of bypass pipe 202. Second temperature sensors 148a, 148b and 148c are mounted to the respective gas-side refrigerant pipes at those positions closer to the respective indoor units than opening valves 15, 25 and 35.

The same arrangement is taken with second branching units B' in association with indoor units $C_{1'}$, $C_{2'}$ and $C_{3'}$.

FIG. 6 illustrates a controller for the super multi-unit type air conditioner system.

Outdoor unit A is provided with an outdoor controller 60. This outdoor controller 60 comprises a microcomputer and its peripheral circuits and is coupled at its outputs to inverter circuits 61 and 62. Inverter circuits 61 and 62 rectify the voltage from an AC power source 63, convert the resultant voltages into AC voltages with given frequencies in accordance with a command from outdoor controller 60, and supply the converted voltages as drive power to compressor motors 1M and 2M, respectively.

First branching unit B (second branching unit B' as well) has a multi-controller 70, which comprises a microcomputer and its peripheral circuits. Multi-controller 70 is coupled at its outputs to flow rate control valves 11, 21 and 31, opening valves 15, 25 and 35 and temperature sensors 147, 148a, 148b and 148c.

Indoor units $C_1$, $C_2$ and $C_3$ have indoor controllers 80, 90 and 100. These indoor controllers 80, 90 and 100 each comprise a microcomputer and its peripheral circuits and are coupled at their output sides to operation sections 81, 91 and 101, and indoor temperature sensors 82, 92 and 102, respectively.

The individual indoor controllers 80, 90 and 100 send frequency setting signals $f_1$, $f_2$ and $f_3$ as demand capabilities of the individual indoor units to multi-controller 70. Multi-controller 70 in turn acquires the demand capabilities of the individual indoor units from the received frequency setting signals and sends a frequency setting signal $f_0$ corresponding to the sum of the demand capabilities to outdoor controller 60.

Multi-controller 70 has the same arrangement as the one employed in the first embodiment. (Refer to the description of this controller given earlier for its detailed structure.)

The operation of thus constructed air conditioner system will be described below referring to FIG. 7.

Assume now that all the indoor units are performing a cooling operation. In this case, indoor controller 80 of indoor unit $C_1$ ($C_{1'}$) calculates the difference between the temperature detected by indoor temperature sensor 82 and the temperature set through operation section 81 and sends the frequency setting signal $f_1$ ($f_{1'}$) corresponding to the temperature difference to multi-controller 70 as the cooling demand-capability. Similarly, indoor controllers 90 and 100 of indoor units $C_2$ and $C_3$ ($C_{2'}$ and $C_{3'}$) send the frequency setting signals $f_2$ and $f_3$ ($f_{2'}$ and $f_{3'}$) as the cooling demand-capability to multi-controller 70.

Based on the received frequency setting signals, multi-controller 70 attains the cooling demand-capability of the individual indoor units and sends the frequency setting signal $f_0$ (and $f_{0'}$) corresponding to the acquired sum of the demand capabilities to outdoor controller 60. In this case, multi-controller 70 holds in advance data about the capacities of the individual indoor units and uses the data as reference to determine the cooling demand-capability.

Based on the received frequency setting signals $f_0$ and $f_{0'}$ from branching units B and B', outdoor controller 60 acquires the total cooling demand-capability by the individual indoor units and controls the quantity of compressors 1 and 2 in operation and the operational frequency (output frequencies of inverter circuits 61 and 62). In this case, as the sum of the cooling demand-capability increases, outdoor controller 60 changes the single-compressor operation involving one compressor to a parallel-compressor operation involving two compressors 1 and 2.

The refrigerants expelled from compressors 1 and 2 include a lubricating oil most of which is collected by oil separator 45 and is returned to compressors 1 and 2 through oil bypass pipe 42. That refrigerant which has not been collected circulates through the refrigerating cycle and returns to compressors 1 and 2.

Multi-controller 70 controls the openings of flow rate control valves 11, 21 and 31 in accordance with the cooling demand-capability of the respective indoor units, thereby controlling the refrigerant flow rate. In addition to this opening control, multi-controller 70 executes the following opening compensation whenever necessary.

Multi-controller 70 reads the detected temperature from temperature sensor 148a (temperature of the refrigerant outgoing from indoor unit $C_1$) and the detected temperature from temperature sensor 203 (pseudo saturated refrigerant temperature) and calculates the difference $\Delta T$ between these two temperatures. This temperature difference $\Delta T$ is the degree of a pseudo refrigerant super heat in indoor unit $C_1$.

When multi-controller 70 discriminates that the temperature difference $\Delta T$ is within the L region (see FIG. 7) below a set value, it performs the normal opening control involving no compensation. When multi-controller 70 discriminates that the temperature difference $\Delta T$ is within the M region (FIG. 7) above the set value, it calculates a compensation opening $\theta$ from the equation given below and outputs a compensation command to refrigerant flow rate valve 11 to increase the opening of the valve 11 by that amount.

$\theta = K \cdot$(capability of indoor unit $C_1$)

where K is a constant.

In this case, multi-controller 70 calculates the temperature difference $\Delta T$ for each given time, and for $\Delta T$ being within the M region, it sends the compensation command to control valve 11 to increase its opening. When discriminating that the temperature difference $\Delta T$ falls down to lie in the N region (FIG. 7) below the set value, multi-controller 70 sends a command to control valve 11 to maintain the opening prior to the temperature change. When discriminating that the temperature difference $\Delta T$ further falls to lie in the L region (FIG. 7), multi-controller 70 sends a command to control valve 11 to return to the normal opening control involving no compensation. Multi-controller 70 also calculates the difference (pseudo refrigerant super heat degree) between the detected temperature from temperature sensor 148b (temperature of the refrigerant outgoing from indoor unit $C_2$) and the detected temperature from temperature sensor 203 and properly executes the opening compensation with respect to refrigerant flow rate control valve 21 in accordance with this temperature difference.

Further, multi-controller 70 calculates the difference (pseudo refrigerant super heat degree) between the detected temperature from temperature sensor 148c (temperature of the refrigerant outgoing from indoor unit $C_3$) and the detected temperature from temperature sensor 203 and properly executes the opening compensation with respect to refrigerant flow rate control valve 31 in accordance with this temperature difference.

The present super multi-unit type air conditioner system detects the refrigerant super heat degree for each indoor unit and compensates for the opening of each refrigerant flow rate control valve in accordance with the detection result to thereby ensure the optimum refrigerant flow rate control for the cooling demand-capability of each indoor unit, irrespective of the length and height of the refrigerant pipe for each indoor unit.

In order to specifically explain the advantage of the above optimum refrigerant flow control, let us assume the case where the air conditioner system is installed in such a way that the refrigerant pipe between branching unit B and each indoor unit is long or the height of the refrigerant pipe extending from branching unit B to the indoor unit is increased. Under this circumstance, the pressure loss in the refrigerant pipe of each indoor unit is large, the amount of the refrigerant flowing to the individual indoor units will be reduced by the normal valve opening control alone. As a result, the refrigeration cycle tends to be an over-heated cycle. However, the valve opening compensation by the optimum refrigerant flow rate control of the present air conditioner system immediately increases the refrigerant flow rate to thereby provide a sufficient cooling demand-capability for each indoor unit.

In other words, this air conditioner system can suppress the restriction relating to the installment of the refrigerant pipes.

Further, since this air conditioner system has a stable refrigerant super heat degree, it can prevent the undesired spray phenomenon from occurring at the refrigerant expelling port of each indoor unit.

Although the above description of the second embodiment discusses the case involving three indoor units for each branching unit, this invention can deal with more than three or only two indoor units easily.

As described above, the air conditioner system according to the second embodiment comprises means for controlling the operational frequencies of compressors in accordance with the total demand-capability of the individual indoor units; refrigerant flow rate control valves, provided for the respective branching units, for controlling the flow rates of the refrigerant going to the individual indoor units; means for controlling the openings of these refrigerant flow rates in accordance with the demand capabilities of the respective indoor units; means for detecting the refrigerant super heat degrees of the individual indoor units; and means for compensating the openings of the individual refrigerant flow rate control valves in accordance with the detection result.

According to this air conditioner system, the opening of each refrigerant flow rate control valve is first controlled in accordance with the demand-capability of each indoor unit. Under this condition, the refrigerant super heat degree for each indoor unit is detected and the opening of each refrigerant flow rate control valve is compensated in accordance with the detection result.

Therefore, the second embodiment of this invention can provide a highly reliable air conditioner system which can perform the optimum refrigerant flow rate control proper for the demand-capability of each indoor unit without being influenced by the length and height of the refrigerant pipe coupled to each indoor unit.

What is claimed is:

1. An air conditioner comprising:
   an outdoor unit having a variable-capability compressor and an outdoor heat exchanger coupled to said variable-capacity compressor;
   a plurality of indoor units, each indoor unit having an indoor heat exchanger and demand-capability data output means for outputting demand-capability data according to an air-conditioning load of its indoor heat exchanger;
   a distributing unit for coupling said outdoor unit and said plurality of indoor units in parallel to form respective refrigeration cycles, said distributing unit having a plurality of refrigerant flow control means corresponding to said refrigeration cycles, respectively;
   first control means, for supplying to said refrigerant flow control means of said distributing unit refrigerant flow control commands associated with demand-capability data of said plurality of indoor units, and outputting sum data of said demand-capability data;
   second control means, for supplying a capacity-change control command to said variable-capability compressor, in accordance with said sum data from said first control means;
   refrigerant super-heat detection means for detecting the degree of refrigerant super heat in each indoor unit, said refrigerant super-heat detection means including a plurality of first temperature sensors for detecting temperatures of said refrigerant expelled from said indoor units, and a second temperature in said refrigeration cycle, and calculating differences between said expelled refrigerant temperatures and said pseudo-saturated refrigerant temperature as a pseudo refrigerant super-heat degree in said indoor units; and
   third control means, for supplying refrigerant flow compensation commands associated with a detection output of said refrigerant super-heat detection means, to said respective refrigerant flow control means of said distributing unit.

2. The air conditioner according to claim 1, further comprising two distributing units for coupling said plurality of indoor units in at least two systems.

3. The air conditioner according to claim 1, wherein said outdoor unit has two variable-capability compressors which are driven one at a time or in parallel, in accordance with said sum data.

4. The air conditioner according to claim 1, wherein said demand-capability data output means of each of said plurality of indoor units includes means for detecting an air-conditioning load of said indoor heat exchanger.

5. The air conditioner according to claim 1, wherein said second temperature sensor is provided in a bypass passage formed via a check valve between a collected assembly of fluid-side refrigerant pipes with respect to said plurality of indoor units and a collected assembly of gas-side refrigerant pipes.

6. The air conditioner according to claim 1, wherein said plurality of refrigerant flow rate control means of said distributing unit each include an electromagnetic valve.

7. The air conditioner according to claim 6, wherein said third control means outputs to said electromagnetic valves valve-opening compensation commands, associated with a plurality of regions, as said refrigerant flow compensation commands.

8. The air conditioner according to claim 7, wherein said plurality of regions include an increasing region, a decreasing region, and a hold region with respect to said valve opening.

9. The air conditioner according to claim 3, wherein said two variable-capability compressors are coupled in parallel at refrigerant expelling sides thereof through a check valve.

10. The air conditioner according to claim 1, wherein said outdoor unit further has a four-way valve, a parallel arrangement of a heating expansion valve and a check valve for forming a cooling cycle, a liquid tank, and an accumulator.

11. The air conditioner according to claim 1, wherein said distributing unit further has parallel arrangements of a plurality of cooling expansion valves and a plurality of check valves for forming heating cycles, and a plurality of gas-side opening valves.

12. The air conditioner according to claim 3, wherein said outdoor unit further has oil separators provided between refrigerant expelling sides of said two variable-capability compressors and said check valves, and oil bypass means provided extending from said oil separators to refrigerant suction sides of said two variable-capability compressors.

13. The air conditioner according to claim 12, wherein said outdoor unit has an oil-balancing means for providing communication between bottom sections of said two variable-capability compressors.

14. The air conditioner according to claim 4, wherein each of said air-conditioning load detecting means includes an operation section for setting an indoor temperature, a temperature sensor for detecting an indoor temperature, and an indoor controller for calculating a difference between said temperature set by said operation section and said temperature detected by said temperature sensor, and outputting said demand-capability data corresponding to said difference.

15. The air conditioner according to claim 1, wherein said first and third control means are provided as a multi-controller in said distributing unit.

16. The air conditioner according to claim 1, wherein said second control means is provided as an outdoor controller in said outdoor unit.

17. The air conditioner according to claim 14, wherein said indoor controller comprises a microcomputer and peripheral circuits thereof.

18. The air conditioner according to claim 15, wherein said multi-controller comprises a microcomputer and peripheral circuits thereof.

19. The air conditioner according to claim 16, wherein said outdoor controller comprises a microcomputer and peripheral circuits thereof and is coupled to a motor of said variable-capability compressor via an inverter coupled to an output side of said outdoor controller.

20. The air conditioner according to claim 1, wherein said demand-capability data and said sum data are each a frequency-setting signal.

* * * * *